(12) United States Patent
Koga et al.

(10) Patent No.: US 6,523,947 B2
(45) Date of Patent: Feb. 25, 2003

(54) INK SET FOR INK-JET RECORDING

(75) Inventors: Narumi Koga, Nagoya (JP); Kazuma Goto, Nagoya (JP); Naomichi Kobayashi, Nagoya (JP); Michiko Aoyama, Nagoya (JP); Shunichi Higashiyama, Yotsukaichi (JP); Masaya Fujioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/097,617

(22) Filed: Mar. 15, 2002

(65) Prior Publication Data

US 2002/0180856 A1 Dec. 5, 2002

(30) Foreign Application Priority Data

Mar. 21, 2001 (JP) ........................................ 2001-081259

(51) Int. Cl.⁷ ............................................... G01D 11/00
(52) U.S. Cl. ........................................ 347/100; 347/100
(58) Field of Search ........................ 347/100; 106/31.27, 106/31.6, 31.13

(56) References Cited

U.S. PATENT DOCUMENTS 5,518,534 A * 5/1996 Pealstine et al. ......... 106/31.75
5,833,743 A * 11/1998 Elwakil .................... 106/31.27

FOREIGN PATENT DOCUMENTS

JP  A 62-101672  5/1987

* cited by examiner

Primary Examiner—John Barlow
Assistant Examiner—Michael S Brooke
(74) Attorney, Agent, or Firm—Oliff & Berridge, PLC

(57) ABSTRACT

A set comprising recording inks, with which the color bleed is reduced even when recording is performed on regular paper, is provided. The ink set for ink-jet recording comprises a black ink and a color ink, wherein each of the black ink and the color ink contains at least water, a coloring agent, and a water-soluble organic solvent, the water-soluble organic solvent contained in the black ink has a solubility parameter which is different by not less than 4 from a solubility parameter of the water-soluble organic solvent contained in the color ink, and the water-soluble organic solvent is contained abundantly in an amount next to an amount of water in each of the inks.

18 Claims, 1 Drawing Sheet

INK SET FOR INK-JET RECORDING

BACKGROUND OF THE INVENTION

1. Field of the Invention

The present invention relates to a recording ink set which is used for an ink-jet printer and includes a combination of different color inks.

2. Description of the Related Art

The ink discharge system, which has been hitherto known for the ink-jet recording system, includes, for example, the electrostatic attraction system, the system in which mechanical vibration or displacement is applied to the ink by using a piezoelectric element or the like, and the method in which bubbles are generated by heating the ink to utilize the pressure generated thereby. Ink droplets are formed by means of the discharge system as described above, and all or a part of the droplets are adhered to a recording objective such as paper to perform the recording. Those known and used as the ink to be employed for the ink-jet recording system as described above include those in which a variety of water-soluble dyes or pigments are dissolved or dispersed in liquid media each comprising water or a combination of water and water-soluble organic solvent.

In order to adequately perform the recording for a long period of time by using the ink as described above, for example, the following conditions are required. That is, the characteristic values including, for example, the viscosity, the surface tension, the electric conductivity, and the density of the ink to be used are appropriate values. In order to avoid any clog-up at the nozzle or the orifice of the recording apparatus, no deposited matter is generated and no physical property value is changed by the influence of heat or the like. Further, the recorded image is excellent, for example, in water resistance and light resistance. A large number of suggestions have been made in order to satisfy the conditions as described above.

However, in recent years, it is more demanded to perform the recording on the regular paper rather than on the exclusive ink-jet paper in view of the cost and the consideration of the environment. In the case of most of the conventional inks, when the recording is performed on the regular paper, the color bleed is apt to occur, which is caused such that the inks of different colors are mixed with each other at portions at which the different colors are adjacent to one another. As a result, a problem arises in that the printing quality is deteriorated.

SUMMARY OF THE INVENTION

The present invention has been made in order to solve the problem as described above, an object of which is to provide a set comprising recording inks with which the color bleed is reduced even when the recording is performed on the regular paper.

According to a first aspect of the present invention, there is provided an ink set for ink-jet recording having a combination of inks of different colors, comprising:

a first ink which contains water, a first coloring agent, and a water-soluble organic solvent; and a second ink which contains water, a second coloring agent different from the first coloring agent, and a water-soluble organic solvent, wherein:

a solubility parameter $\delta 1$ of the water-soluble organic solvent contained in the first ink satisfies a relationship of $4 \leq |\delta 1 - \delta 2|$ with respect to a solubility parameter $\delta 2$ of the water-soluble organic solvent contained in the second ink.

In general, the bleeding, which is caused at the boundary between inks such as black and yellow, is relatively conspicuous. In the ink set of the present invention, in order to avoid the bleeding as described above, it is desirable that the first ink is a black ink containing a black coloring agent, and the second ink is a color ink, for example, a cyan, magenta, or yellow ink containing a color coloring agent other than the black coloring agent. The ink set may further comprise third and fourth coloring agents having colors different from those of the first and second coloring agents respectively. It is necessary that the water-soluble organic solvents contained in the first ink and the second ink of the ink set of the present invention have their solubility parameters $\delta 1$, $\delta 2$ which satisfy the relationship of $4 \leq |\delta 1 - \delta 2|$. The water-soluble organic solvent in each of the inks may be based on a single species or a mixed system containing a plurality of species. However, even when a plurality of water-soluble organic solvents are contained in the first ink, it is necessary that any one of the water-soluble organic solvents contained in the first ink satisfies the relationship of $4 \leq |\delta 1 - \delta 2|$ for the solubility parameters $\delta 1$, $\delta 2$ with respect to the water-soluble organic solvent contained in the second ink. When a plurality of water-soluble organic solvents are contained in each of the first ink and the second ink, it is necessary that any one of the water-soluble organic solvents contained in the first ink satisfies the relationship of $4 \leq |\delta 1 - \delta 2|$ for the solubility parameters $\delta 1$, $\delta 2$ with respect to any one of the water-soluble organic solvents contained in the second ink.

According to a second aspect of the present invention, there is provided an ink cartridge to be used for an ink-jet or ink-jetting type recording apparatus, comprising:

a first compartment which accommodates a first ink containing water, a first coloring agent, and a water-soluble organic solvent; and a second compartment which accommodates a second ink containing water, a second coloring agent different from the first coloring agent, and a water-soluble organic solvent, wherein:

a solubility parameter $\delta 1$ of the water-soluble organic solvent contained in the first ink satisfies a relationship of $4 \leq |\delta 1 - \delta 2|$ with respect to a solubility parameter $\delta 2$ of the water-soluble organic solvent contained in the second ink.

The water to be used in the present invention is not specifically limited. However, it is preferable to use water having high purity such as ion exchange water and distilled water excluding, for example, tap water. The content of the water may be determined depending on the type and the composition of the coloring agent and the water-soluble organic solvent or the characteristics of the desired ink. However, in general, it is preferable that the content is 10 to 97% by weight with respect to the total weight of the ink. If the content is less than 10% by weight, then the viscosity of the ink is too high, and it is difficult to discharge the ink from the head. If the content exceeds 97% by weight, the ink is apt to be dried. The content is more preferably 30 to 95% by weight, and much more preferably 40 to 90% by weight.

Those usable as the coloring agent to be used in the present invention include, for example, dyes and pigments. Those usable as the dye include, for example, water-soluble dyes represented by direct dye, acidic dye, basic dye, and reactive dye. The water-soluble dye is not specifically limited. However, it is preferable to use those which are adequate for the ink to be used for the ink-jet recording system and which satisfy required performance such as vividness, water solubility, stability, light resistance, and other required performance, including, for example, C. I.

Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2.

The pigment is not specifically limited provided that the pigment is capable of being dispersed in the aqueous phase. The pigment includes, for example, azo pigment such as azo lake, insoluble azo pigment, condensed azo pigment, and chelate azo pigment; polycyclic pigment such as phthalocyanine pigment, perylene, perynone pigment, anthraquinone pigment, quinacridone pigment, dioxazine pigment, thioindigo pigment, isoindolinone pigment, and quinophthalone pigment; dye lake such as basic dye type lake and acidic dye type lake; organic pigment such as nitro pigment, nitroso pigment, and aniline black daylight fluorescent pigment; and inorganic pigment such as titanium oxide, iron oxide-based pigment, and carbon black-based pigment. For example, those obtained by applying a surface treatment to the various pigments described above, for example, with a surfactant or a macromolecular dispersing agent can be also used as the pigment to be used in the present invention. Such a material includes, for example, graft carbon.

When the pigment as described above is used as the coloring agent to be used in the present invention, a dispersing treatment is performed in accordance with a conventionally known method together with an appropriate dispersing agent, a solvent, pure water, and optionally other additives. Those usable as the dispersing agent include, for example, a surfactant and a macromolecular dispersing agent to be used to disperse the pigment as described in Japanese Patent Application Laid-Open No. 62-101672. The macromolecular dispersing agent is not specifically limited, including, for example, protein such as gelatin and albumin; natural rubber such as gum arabic and gum traganth; glucoside such as saponin; cellulose derivative such as methyl cellulose, carboxy cellulose, and hydroxymethyl cellulose; natural macromolecule such as lignosulfonate and shellac; anionic macromolecule such as salt of polyacrylic acid, salt of styrene-acrylic acid copolymer, salt of vinylnaphthalene-acrylic acid copolymer, salt of styrene-maleic acid copolymer, salt of vinylnaphthalene-maleic acid copolymer, and sodium salt and phosphoric acid salt of β-naphthalenesulfonic acid-formalin condensate; and nonionic macromolecule such as polyvinyl alcohol, polyvinyl pyrrolidone, and polyethylene glycol.

The surfactant includes, for example, anionic surfactant such as higher alcohol sulfuric acid ester salt, liquid fatty oil sulfuric acid ester salt, and alkylarylsulfonic acid salt; and nonionic surfactant such as polyoxyethylene alky ether, polyoxyethylene alkyl ester, sorbitan alkyl ester, and polyoxyethylene sorbitan alkyl ester. The dispersing agent may be used singly, or two or more of the dispersing agents may be used in combination. It is preferable that the dispersing agent is generally blended in an amount of 0.01 to 20% by weight with respect to the total weight of the ink. If the blending amount is less than 0.01% by weight, an effect such as adjustment of surface tension or the like is not sufficiently expressed. If the blending amount exceeds 20% by weight, then the effect is not only enhanced, but also any harmful influence such as increase in ink viscosity appears in some cases.

The dispersing machine, which is used for the dispersing treatment for the pigment as described above, is not specifically limited. It is possible to widely use general dispersing machines. However, the dispersing machine includes, for example, ball mills, roll mills, and sand mills. Especially, it is preferable to use a high speed type sand mill. The dye and the pigment may be used singly respectively. Alternatively, two or more dyes, two or more pigments, or two or more dyes and pigments may be mixed and used. It is preferable that the content of the coloring agent is generally 0.1 to 20% by weight with respect to the total weight of the ink. If the content is less than 0.1% by weight, it is difficult to sufficiently develop the color on the regular paper. If the content exceeds 20% by weight, the coloring agent is deposited and/or aggregated in the ink in some cases. The content is more preferably 0.3 to 1.5% by weight, and much more preferably 0.5 to 10% by weight.

The water-soluble organic solvent to be used in the present invention is not specifically limited, including, for example, alkyl alcohol having a number of carbon or carbons of 1 to 5 such as methyl alcohol, ethyl alcohol, n-propyl alcohol, and n-butyl alcohol; amide such as dimethylformamide and dimethylacetoamide; ketone or ketone alcohol such as acetone and diacetone alcohol; ether such as tetrahydrofuran and dioxane; alkylene glycol containing alkylene group having a number of carbons of 2 to 6 such as ethylene glycol, propylene glycol, triethylene glycol, and diethylene glycol; glycerol; polyalkylene glycol such as polyethylene glycol and polypropylene glycol; lower monoalkyl ether of polyhydric alcohol such as ethylene glycol monomethyl (or ethyl) ether, diethylene glycol monomethyl (or ethyl) ether, and triethylene glycol monomethyl (or ethyl) ether; lower dialkyl ether of polyhydric alcohol such as triethylene glycol dimethyl (or ethyl) ether; sulfolane, pyrrolidone, N-methyl-2-pyrrolidone, 1,3-dimethyl-2-imidazolidinone, and 1,5-pentanediol. The water-soluble organic solvent as described above may be used singly. Alternatively, two or more of the water-soluble organic solvents as described above may be used in combination. When two or more species of the water-soluble organic solvents are used in combination in one ink (first ink), it is necessary that each of the water-soluble organic solvents satisfies the relationship of solubility parameter as described later on with respect to the water-soluble organic solvent contained in the other ink (second ink).

The content of the water-soluble organic solvent is not specifically limited provided that the water-soluble organic solvent is contained abundantly in an amount next to the amount of water. The content of the water-soluble organic solvent may be determined within a wide range depending on the composition of the ink or the desired characteristics of the ink. However, it is preferable that the water-soluble organic solvent is contained in an amount of not less than 3% by weight. If the content of the water-soluble organic solvent is less than 3% by weight, the color bleed-suppressing effect is not sufficiently expressed when the ink makes contact with another adjacent ink. The content is more preferably 3 to 40% by weight, and much more preferably 5 to 30% by weight.

The water-soluble organic solvents, which are contained in the black ink and the color ink included in the ink-jet recording ink set of the present invention, are used in combination so that the water-soluble organic solvents are different from each other in solubility parameter by not less than 4. In this specification, the solubility parameter ($\delta$) refers to the value calculated by the following calculation expression of Fedors from the molar volume ($\Delta vi$) and the evaporation energy ($\Delta ei$) of the atom or the atomic group of the chemical structure.

$$[\delta=(\Sigma\Delta ei/\Sigma\Delta vi)^{1/2}] \quad \text{(Expression of Fedors)}$$

Besides the solubility parameter being determined by the calculation from the chemical composition as described above, the solubility parameter can be also determined from actually measured values including, for example, the calculation from the evaporation heat, the calculation from the refractive index, the calculation from the kauri-butanol value, and the calculation from the surface tension.

Usually, the water-soluble organic solvents are readily compatible when the values of the solubility parameters are close to one another. The water-soluble organic solvents are hardly compatible when the difference in value is large. If the difference in numerical value is less than 4, no sufficient suppressing effect is expressed on the color bleed. The effect is observed when the difference in value is not less than 4. Usually, those having a difference of 4 to 10 are preferably selected. When two or more of the color inks are contained in the ink set for the ink-jet recording of the present invention, the solubility parameters of the water-soluble organic solvents contained in the respective color inks may be identical.

Preferred combinations of the water-soluble organic solvents include, for example, a combination of ethylene glycol ($\delta=17.8$) and 1,3-butanediol ($\delta=11.6$), a combination of ethylene glycol ($\delta=17.8$) and 2-pyrrolidone ($\delta=13.1$), a combination of glycerol ($\delta=20.2$) and 2-pyrrolidone ($\delta=13.1$), a combination of glycerol ($\delta=20.2$) and diethylene glycol ($\delta=15.0$), a combination of diethylene glycol ($\delta=15.0$) and diethylene glycol monoethyl ether ($\delta=10.9$), and a combination of polypropylene glycol ($\delta=10.3$) and diethylene glycol ($\delta=15.0$).

Additionally, the ink contained in the ink set for the ink-jet recording of the present invention may optionally contain, for example, hitherto known various types of dispersing agents, surfactants, viscosity-adjusting agents, surface tension-adjusting agents, pH-adjusting agents, antiseptic agents, and fungicides. When the ink set for the ink-jet recording of the present invention is used for the ink-jet recording method of the type in which the recording liquid is electrically charged, it is also preferable to contain specific resistance-adjusting agents including, for example, inorganic salts such as lithium chloride, ammonium chloride, and sodium chloride. Further, when the ink set for the ink-jet recording of the present invention is used for the ink-jet system of the type in which the ink is discharged in accordance with the action of the thermal energy, for example, it is also preferable to adjust values of thermal physical properties including, for example, the specific heat, the coefficient of thermal expansion, and the coefficient of thermal conductivity.

The problems involved in the conventional technique are sufficiently solved in the ink set for the ink-jet recording of the present invention obtained as described above. The color bleed is reduced in the ink-jet system. It is possible to provide the vivid color recording even on the regular paper.

DESCRIPTION OF THE PREFERRED EMBODIMENTS

Figure 1:
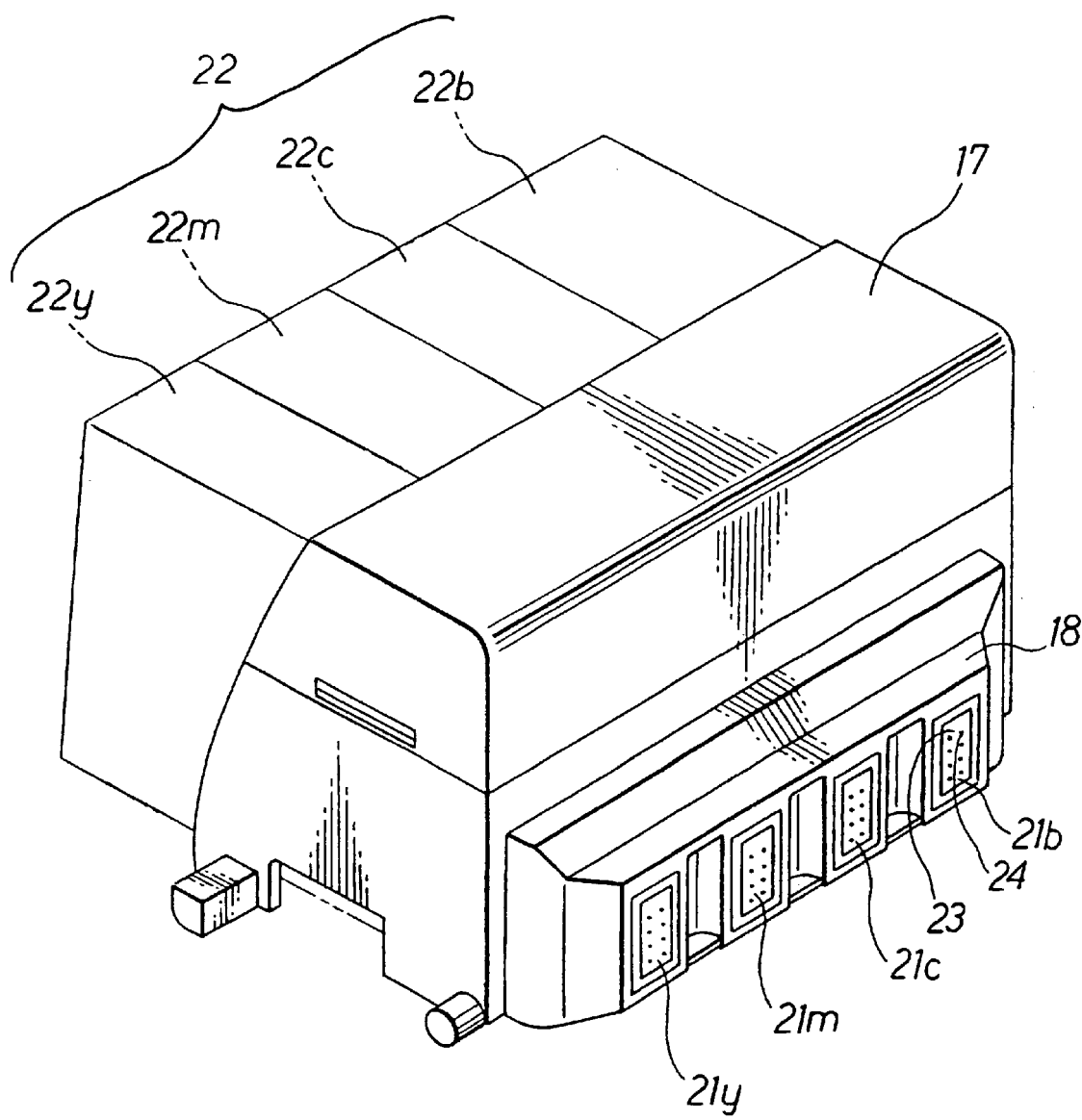
FIG. 1 shows an ink jet head which ejects four color inks and is provided with a color ink cartridge in accordance with the invention.

The present invention will be explained in further detail below as exemplified by embodiments. However, the present invention is not limited to only the embodiments.

EXAMPLE 1

Composition of Black Ink

| | |
|---|---|
| C. I. Direct Black 154 | 2 parts by weight |
| C. I. Direct Black 19 | 2 parts by weight |
| Ethylene glycol ($\delta$ = 17.8) | 23 parts by weight |
| Pure water | balance |
| Total | 100 parts by weight |

Composition of Cyan Ink

| | |
|---|---|
| C. I. Direct Blue 199 | 2 parts by weight |
| 1,3-Butanediol ($\delta$ = 11.6) | 20 parts by weight |
| Pure water | balance |
| Total | 100 parts by weight |

The inks were subjected to the recording by using MFC-7150C (ink-jet printer produced by BROTHER INDUSTRIES, LTD.). The recording was performed by combining the colors so that the inks having the two different colors formed the letter color and the background color respectively, i.e., the black letter color and the blue background color as well as the blue letter color and the black background color on recording samples. The evaluation was directed to the blur at the boundary at which the colors were mixed with each other and to the distinction of letters. Letters, which were recorded without any background of each of the colors, were used for a recording sample to serve as an evaluation standard. As for the dimension of the recorded letters, the letter size was set to 11 with Microsoft Word 97. The recording was performed on the regular paper (Xerox 4200) by using MFC-7150C.

The difference in solubility parameter was 6.3 for this combination. Vivid images were formed without any color bleed on the output onto the regular paper.

EXAMPLE 2

Composition of Black Ink

| | |
|---|---|
| C. I. Direct Black 154 | 2 parts by weight |
| C. I. Direct Black 19 | 2 parts by weight |
| Ethylene glycol ($\delta$ = 17.8) | 23 parts by weight |
| Pure water | balance |
| Total | 100 parts by weight |

Composition of Magenta Ink

| | |
|---|---|
| C. I. Direct Red 80 | 2 parts by weight |
| 2-Pyrrolidone (δ = 13.1) | 23 parts by weight |
| Pure water | balance |
| Total | 100 parts by weight |

The respective inks described above were used to make output onto the regular paper in the same manner as in Example 1. The difference in solubility parameter was 4.7 for this combination. Vivid images were formed without any color bleed on the output onto the regular paper.

EXAMPLE 3

Composition of Black Ink

| | |
|---|---|
| C. I. Direct Black 154 | 2 parts by weight |
| C. I. Direct Black 19 | 2 parts by weight |
| Glycerol (δ = 20.2) | 20 parts by weight |
| Pure water | balance |
| Total | 100 parts by weight |

Composition of Yellow Ink

| | |
|---|---|
| C. I. Direct Yellow 142 | 2 parts by weight |
| 2-Pyrrolidone (δ = 13.1) | 23 parts by weight |
| Pure water | balance |
| Total | 100 parts by weight |

The respective inks described above were used to make output onto the regular paper in the same manner as in Example 1. The difference in solubility parameter was 7.1 for this combination. Vivid images were formed without any color bleed on the output onto the regular paper.

As described above, in each of Examples 1 to 3, the blur due to the color bleed was scarcely observed for the ink set for the ink-jet recording of the present invention.

COMPARATIVE EXAMPLE 1

Inks were prepared to make output in the same manner as in Example 1 except that 23 parts by weight of ethylene glycol (δ=17.8) used for the black ink were replaced with 21 parts by weight of 1,3-butanediol (δ=11.6). The difference in solubility parameter was zero for this combination. The color bleed was caused at portions at which the inks were adjacent to one another on the output onto the regular paper. Obtained images were indistinct.

COMPARATIVE EXAMPLE 2

Inks were prepared to make output in the same manner as in Example 2 except that 23 parts by weight of ethylene glycol (δ=17.8) used for the black ink were replaced with 20 parts by weight of diethylene glycol (δ=15.0). The difference in solubility parameter was 1.9 for this combination. The color bleed was caused at portions at which the inks were adjacent to one another on the output onto the regular paper. Obtained images were indistinct.

COMPARATIVE EXAMPLE 3

Inks were prepared to make output in the same manner as in Example 3 except that 23 parts by weight of 2-pyrrolidone (δ=13.1) used for the yellow ink were replaced with 20 parts by weight of ethylene glycol (δ=17.8). The difference in solubility parameter was 2.8 for this combination. The color bleed was caused at portions at which the inks were adjacent to one another on the output onto the regular paper. Obtained images were indistinct.

An embodiment of an ink cartridge is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet.

The present invention has been explained above. According to the present invention, it is possible to provide the ink set and the ink cartridge for the ink-jet recording capable of reducing the color bleed and performing the vivid color recording.

What is claimed is:

1. An ink set for ink-jet recording having a combination of inks of different colors, comprising:
    a first ink which contains water, a first coloring agent, and a water-soluble organic solvent; and
    a second ink which contains water, a second coloring agent different from the first coloring agent, and a water-soluble organic solvent, wherein:
    a solubility parameter $\delta 1$ of the water-soluble organic solvent contained in the first ink satisfies a relationship of $4 \leq |\delta 1 - \delta 2|$ with respect to a solubility parameter $\delta 2$ of the water-soluble organic solvent contained in the second ink.

2. The ink set according to claim 1, wherein the first coloring agent is a black coloring agent, and the second coloring agent is a color coloring agent other than the black.

3. The ink set according to claim 1, wherein the water-soluble organic solvent is contained by not less than 3% by weight in each of the first ink and the second ink.

4. The ink set according to claim 1, further comprising third and fourth inks containing third and fourth coloring agents of colors different from those of the first and second coloring agents respectively.

5. The ink set according to claim 1, wherein the solubility parameter $\delta 1$ and the solubility parameter $\delta 2$ satisfy $4 \leq |\delta 1 - \delta 2| \leq 10$.

6. The ink set according to claim 1, wherein each of the water-soluble organic solvents contained in the first ink and the second ink is selected from the group consisting of ethylene glycol, diethylene glycol, 1,3-butanediol, 2-pyrrolidone, glycerol, diethylene glycol monoethyl ether, and polypropylene glycol.

7. The ink set according to claim 6, wherein the first water-soluble organic solvent is ethylene glycol, and the second water-soluble organic solvent is 1,3-butanediol.

8. The ink set according to claim 6, wherein the first water-soluble organic solvent is ethylene glycol, and the second water-soluble organic solvent is 2-pyrrolidone.

9. The ink set according to claim 6, wherein the first water-soluble organic solvent is glycerol, and the second water-soluble organic solvent is 2-pyrrolidone.

10. An ink cartridge having a plurality of inks for use in an ink-jet recording apparatus, comprising:
- a first compartment which accommodates a first ink containing water, a first coloring agent, and a water-soluble organic solvent; and
- a second compartment which accommodates a second ink containing water, a second coloring agent different from the first coloring agent, and a water-soluble organic solvent, wherein:
- a solubility parameter $\delta1$ of the water-soluble organic solvent contained in the first ink satisfies a relationship of $4 \leq |\delta1-\delta2|$ with respect to a solubility parameter $\delta2$ of the water-soluble organic solvent contained in the second ink.

11. The ink cartridge according to claim 10, wherein the first coloring agent is a black coloring agent, and the second coloring agent is a color coloring agent other than the black.

12. The ink cartridge according to claim 10, wherein the water-soluble organic solvent is contained by not less than 3% by weight in each of the first ink and the second ink.

13. The ink cartridge according to claim 10, further comprising third and fourth compartments which accommodate third and fourth inks containing third and fourth coloring agents of colors different from those of the first and second coloring agents respectively.

14. The ink cartridge according to claim 10, wherein the solubility parameter $\delta1$ and the solubility parameter $\delta2$ satisfy $4 \leq |\delta1-\delta2| \leq 10$.

15. The ink cartridge according to claim 10, wherein each of the water-soluble organic solvents contained in the first ink and the second ink is selected from the group consisting of ethylene glycol, diethylene glycol, 1,3-butanediol, 2-pyrrolidone, glycerol, diethylene glycol monoethyl ether, and polypropylene glycol.

16. The ink cartridge according to claim 15, wherein the first water-soluble organic solvent is ethylene glycol, and the second water-soluble organic solvent is 1,3-butanediol.

17. The ink cartridge according to claim 15, wherein the first water-soluble organic solvent is ethylene glycol, and the second water-soluble organic solvent is 2-pyrrolidone.

18. The ink cartridge according to claim 15, wherein the first water-soluble organic solvent is glycerol, and the second water-soluble organic solvent is 2-pyrrolidone.

* * * * *